United States Patent [19]

Sakamoto et al.

[11] 4,195,260

[45] Mar. 25, 1980

[54] APPARATUS FOR SENSING DETERIORATION OF DEVELOPING SUBSTANCE INCLUDING FERROMAGNETIC CARRIER AND NON-MAGNETIC TONER PARTICLES

[75] Inventors: Koji Sakamoto; Seiichi Miyakawa; Susumu Tatsumi, all of Tokyo, Japan

[73] Assignee: Ricoh Company, Ltd., Tokyo, Japan

[21] Appl. No.: 875,345

[22] Filed: Feb. 6, 1978

[30] Foreign Application Priority Data

Feb. 9, 1977 [JP] Japan ................................ 52-13884

[51] Int. Cl.[2] ................................................ G01N 9/00

[52] U.S. Cl. .................................... 324/204; 324/236; 355/3 DD; 222/DIG. 1; 118/689

[58] Field of Search ................................ 427/8, 9, 10; 222/DIG. 1; 118/7, 9, 646; 355/3 DD, 14; 324/204, 236

[56] References Cited

U.S. PATENT DOCUMENTS 3,999,687 12/1976 Baer et al. ............................ 118/646

*Primary Examiner*—Rudolph V. Rolinec
*Assistant Examiner*—Walter E. Snow
*Attorney, Agent, or Firm*—Frank J. Jordan

[57] ABSTRACT

Deterioration of a dry developing substance causes toner particles to be so strongly adhered to carrier particles that they cannot be readily separated therefrom. The present apparatus comprises means for applying a predetermined electrostatic or air suction force to the developer to readily remove toner therefrom except for spent toner particles strongly adhered to the carrier particles. The toner density, or the ratio of toner to carrier particles, is then measured electromagnetically or optically and compared to a reference value. The developer deterioration determines what proportion of toner will be removed from the developer by said force and thereby the subsequently sensed toner density. The higher the sensed toner density, the greater the degree of deterioration.

28 Claims, 9 Drawing Figures

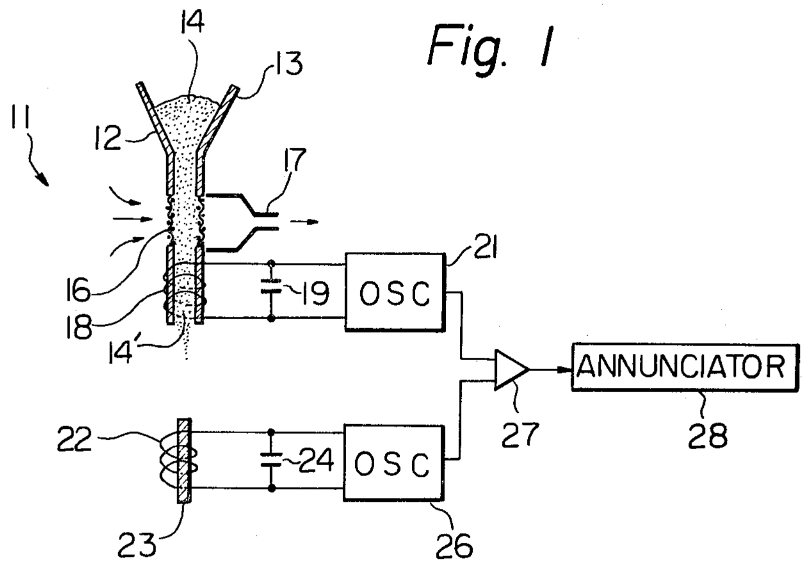
Fig. 1
Fig. 2
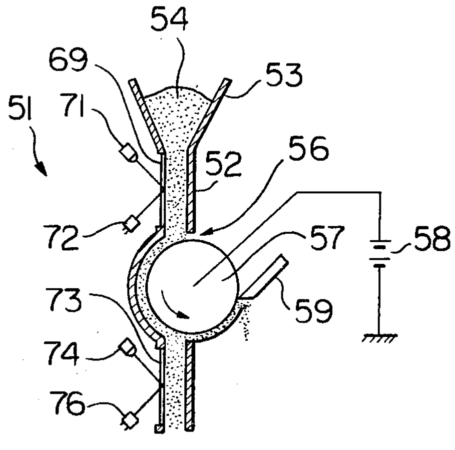
Fig. 3
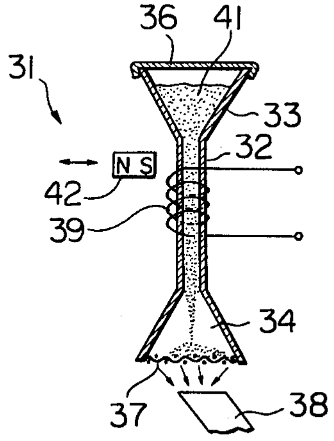

APPARATUS FOR SENSING DETERIORATION OF DEVELOPING SUBSTANCE INCLUDING FERROMAGNETIC CARRIER AND NON-MAGNETIC TONER PARTICLES

BACKGROUND OF THE INVENTION

The present invention relates to a method and apparatus for measuring the degree of deterioration of a dry developing substance in an electrostatic copying machine or other electrostatographic apparatus.

In an electrostatic copying machine a photoconductive drum is uniformly electrostatically charged and then radiated with a light image of an original document to form an electrostatic image of the document on the drum through localized photoconduction. A developing substance is applied to the drum to develop the electrostatic image into a toner image which is transferred and fixed to a copy sheet to provide a hard copy of the original document.

The developing substance comprises ferromagnetic carrier particles which are magnetically adhered to a rotating cylinder to form a magnetic brush which brushingly engages the drum. Colored toner particles are included in the developing substance which adhere to the carrier particles due to electrostatic attraction caused by dry friction. The copying machine is arranged in such a manner that the electrostatic charge on the toner particles is opposite in polarity to the charge on the drum. Thus, the toner particles are attracted and adhere to the areas of high electrostatic potential of the electrostatic image on the drum which correspond to dark areas of the original document.

The development process depends on the ability of the toner particles to be attracted and adhered to the drum from the magnetic brush. In addition, the toner consumed in the developing process must be replenished to maintain the toner density constant. The toner density is defined as the proportion of toner to carrier particles in the developing substance. However, after the developing substance is used for a considerable period of time the toner particles are attracted to the carrier particles with such a great force that they cannot be readily separated therefrom in the development process. The developing substance under these conditions is said to be deteriorated, or "spent", and results in progressively lower copy density even if the toner density is maintained constant or increased above the normal value.

Thus, in order to provide proper development in electrostatography, it is necessary both to replenish the toner consumed by the development process and sense when the developing substance has deteriorated to the extent that it must be replaced.

It is known in the art to sense the toner density by means of an electromagnetic coil which is electromagnetically coupled with the developing substance. The carrier particles in the developing substance effectively constitute a ferromagnetic core of the coil. The effective inductance of the coil depends on the ratio of toner to carrier particles in the developing substance. The toner density is thereby a function of the coil inductance and may be measured by measuring the impedance to flow of alternating current or the like through the coil. In an improved toner density sensing apparatus, the coil is connected in parallel with a capacitor of known value to constitute a parallel resonant circuit which determines the frequency of an oscillator. The oscillator frequency is thereby a predetermined function of the toner density, and constitutes a measure of the same.

However, the toner density sensing apparatus described is not able to measure the degree of deterioration of the developing substance. A prior art apparatus for measuring said deterioration has been proposed which comprises means for charging a portion of the photoconductive drum to a predetermined potential, developing said portion and measuring the optical density thereof by means of a photoelectric sensor. The lower the sensed optical density, the greater the degree of deterioration.

This optical sensor does not, however, provide accurate measurement of the developer deterioration in practical application due to the numerous variables involved in the copying process. Variations in the output of the charging unit, fatigue of the photoconductive drum, ambient temperature and humidity and other factors influence the results of the measurement to an unacceptable extent.

SUMMARY OF THE INVENTION

The present invention overcomes the drawbacks of the prior art by applying a predetermined force to a developing substance to readily remove toner therefrom except for spent toner strongly adhered to carrier. The toner density is then measured and compared to a reference value. The degree of deterioration of the developing substance determines what proportion of the toner will be removed by said force, and thereby the subsequently sensed toner density. The higher the sensed toner density, the greater the degree of deterioration of the developing substance.

It is an object of the present invention to provide an effective and accurate method of measuring the deterioration of a developing substance in an electrostatic copying machine.

It is another object of the present invention to provide an apparatus embodying the above method.

It is another object of the present invention to provide accurate means for indicating when a developing substance should be replaced.

It is another object of the present invention to provide an apparatus which measures both toner density and developer deterioration.

It is another object of the present invention to provide a generally improved developer deterioration sensing method and apparatus for electrostatography.

Other objects, together with the foregoing, are attained in the embodiments described in the following description and illustrated in the accompanying drawing.

BRIEF DESCRIPTION OF THE DRAWING

FIG. 1 is a schematic diagram of a first embodiment of a sensing apparatus of the present invention;

FIG. 2 is similar to FIG. 1 but illustrates a second embodiment of the present invention;

FIG. 3 illustrates a modification of the embodiment of FIG. 1;

DESCRIPTION OF THE PREFERRED EMBODIMENTS

Figure 4:
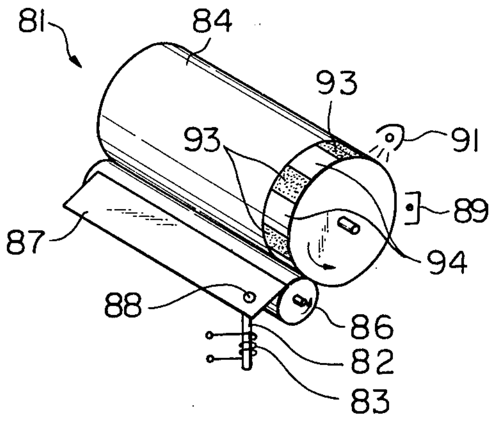
FIG. 4 illustrates a third embodiment of the present invention.

While the developer deterioration sensing apparatus of the invention is susceptible of numerous physical embodiments, depending upon the environment and requirements of use, substantial numbers of the herein shown and described embodiments have been made, tested and used, and all have performed in an eminently satisfactory manner.

Referring now to FIG. 1 of the drawing, a developer deterioration sensing apparatus of the present invention is generally designated by the reference numeral 11 and comprises a vertical conduit 12 formed with a funnel portion 13 at the upper end thereof. A dry developing substance for electrostatography is indicated at 14 and is introduced into the funnel 13 either automatically by means not shown or manually as desired. The developing substance 14 comprises ferromagnetic carrier particles and colored toner particles and is caused by gravity to fall through the conduit 12.

The conduit 12 is provided with an intermediate mesh portion 16. The inlet of a conduit 17 leading to a suction pump (not shown) is oriented adjacent to and facing the mesh portion 16 in such a manner that an air suction force of predetermined magnitude is applied to the developing substance 14 through the openings of the mesh portion 16.

Typically, the mean diameter of the carrier particles of the developing substance 14 is on the order of 150 microns and that of the toner particles is 15 microns. Where the mesh portion 16 has a size of 400 mesh, the toner particles may readily pass through the mesh portion 16 into the conduit 17 but the carrier particles including spent toner particles strongly adhered thereto are retained in the conduit 12. In other words, a predetermined suction force is applied to the toner particles urging the same to separate and be removed from the carrier particles, while the carrier particles including the spent toner particles are held by the mesh portion 16 due to the fact that the diameter of the carrier particles is larger than the diameter of the openings in the mesh.

The proportion of toner particles which will be removed from the developing substance by the predetermined suction force corresponds to the developer deterioration. The greater the deterioration of the developing substance 14, the greater the force adhering the toner particles to the carrier particles and the fewer the toner particles which will be sucked away through the conduit 17. Thus, the greater the deterioration of the developing substance 14, the greater the toner density of the developing substance after application of the suction force causing removal of toner therefrom.

An electromagnetic coil 18 is wound around the lower portion of the conduit 12. Preferably, the conduit 12 is made of a non-magnetic material and the coil 18 is electromagnetically coupled with the developing substance in the portion of the conduit 12 below the mesh portion 16, said developing substance after removal of toner being designated as 14'. A capacitor 19 of predetermined value is connected in parallel with the coil 18 to form a parallel resonant circuit therewith which determines the frequency of an oscillator 21. The greater the toner density and degree of developer deterioration, the higher the frequency of the oscillator 21 due to decreased effective inductance of the coil 18. It will be understood that the frequency of the oscillator 21 corresponds to the toner density of the developing substance 14'.

A reference coil 22 is wound around a ferromagnetic core 23 and connected in parallel with a capacitor 24 to determine the frequency of an oscillator 26. Preferably, the inductance of the coil 22 in combination with the core 23 is equal to the effective inductance of the coil 18 with fresh developing substance introduced into the funnel 13, and value of the capacitor 24 is equal to that of the capacitor 19. Thus, with fresh developing substance introduced into the funnel 13, the oscillators 21 and 26 oscillate at the same frequency.

The outputs of the oscillators 21 and 26 are applied to a comparator 27 which produces an output signal corresponding to the difference between the two applied frequencies. The output of the comparator 27 is applied to an annunciator 28 which produces an indication when the magnitude of the output of the comparator 27 exceeds a predetermined value corresponding to deterioration of the developing substance 14 beyond a maximum acceptable limit. The greater the deterioration of the developing substance 14, the higher the frequency of the oscillator 21 and the greater the difference between the frequencies of the oscillators 21 and 26 since the frequency of the oscillator 26 is constant.

As an alternative, although not illustrated, the coil 22 may be wound around the conduit 12 above the conduit 17. In this case, the coil 23 will be constituted by the developing substance 14 in the conduit 12, and the frequency of the oscillator 26 will indicate the toner density of the developing substance 14 prior to removal of toner through the conduit 17. The difference between the frequencies of the oscillators 21 and 26 will again indicate the degree of deterioration of the developing substance 14, but the measurement will be relative rather than absolute as is the case in the embodiment illustrated in FIG. 1. This modification allows the coil 22 to sense the initial toner density of the developing substance which indicates the amount of toner which must be added to the developing substance 14 to replace the toner consumed in the developing process and maintain the toner density constant.

FIG. 3 illustrates a modification of the embodiment of FIG. 1 which is designated as 31 and comprises a conduit 32 formed with funnel portions 33 and 34 at the initially upper and lower ends thereof respectively. A detachable cap 36 is provided to the funnel 33 and a mesh 37 of the same size as the mesh portion 16 is provided to the funnel 34. A conduit 38 leading to a suction pump (not shown) opens toward the mesh 37. A coil 39 wound around the intermediate portion of the conduit 32 is connected to a capacitor and oscillator although not shown.

Developing substance 41 is introduced into the funnel 33 and the cap 36 attached thereto. A magnet 42 may be moved close to the neck of the funnel 33 to maintain the developing substance 41 therein.

Removal of the magnet 42 allows the developing substance 41 to fall through the conduit 32 under the force of gravity. The coil 39 senses the toner density of the developing substance 41 in the manner described above. The developing substance 41 accumulates on the mesh 37 after falling through the conduit 32.

The suction force is applied to the developing substance 41 through the conduit 38 to remove toner therefrom except for spent toner particles strongly adhered to carrier particles in the same manner as in the embodiment of FIG. 1. If desired, the conduit 32 may be vibrated to enhance the toner removal. Then, the conduit 32 is inverted and the developing substance with the toner removed falls through the conduit 32 from the funnel 34 to the funnel 33. During this process, the toner density is sensed by the coil 39. The difference between the sensed toner densities corresponds to the developer deterioration.

The apparatus 31 measures the initial toner density of the developing substance 41 in addition to the developer deterioration. Furthermore, the apparatus 31 is portable compact and ideally suited for use by service technicians who may carry the apparatus 31 as a standard item in their repair kits.

FIG. 2 illustrates another apparatus 51 of the present invention which comprises a conduit 52 formed with an upper funnel portion 53 into which is introduced a developing substance 54. The conduit 52 is formed with a cutout 56 into which intrudes a ferromagnetic cylinder 57 which is rotated counterclockwise at constant speed. The developing substance 54 must flow around the cylinder 57 while falling through the conduit 52. It will be further noted that the portion of the cylinder 57 around which the developing substance 54 flows moves in the same direction as the developing substance 54.

A bias voltage source 58 applies an electric bias voltage or potential of a polarity opposite to that of the electrostatic charge on the toner particles to the cylinder 57, causing toner particles to be attracted and adhered to the cylinder 57. The proportion of toner particles which are separated from the carrier particles except for spent toner particles strongly adhered to the carrier particles is determined by the degree of deterioration of the developing substance 54 since the bias voltage on the cylinder 57 applies a predetermined electrostatic force to the toner particles.

The toner particles which adhere to the cylinder 57 are carried thereby external of the conduit 52 and removed therefrom by a scraper 59.

The conduit 52 is provided with a transparent wall portion 69 above the cutout 56. A light source 71 radiates light through the portion 69 onto the developing substance 54 in the conduit 52 and a photosensor 72 measures the light reflected from the developing substance 54.

Whereas the toner particles are black in color, the carrier particles are white or gray. Therefore, the optical density of the developing substance 54 increases as the toner density increases. Another transparent wall portion 73 is provided to the conduit 52 below the cutout 56. A light source 74 and photosensor 76 are provided to the portion 73 in the same manner as the light source 71 and photosensor 72. The outputs of the photosensors 72 and 76 constitute measures of the toner density of the developing substance 54 before and after removal of toner therefrom by the cylinder 57. The difference between these two densities corresponds to the degree of developer deterioration.

FIG. 4 illustrates an apparatus 81 of the present invention comprising a conduit 82 and a sensor coil 83 wound around the conduit 82. A photoconductive drum 84 of an electrostatic copying machine (not shown) is rotated counterclockwise at constant speed. A developing substance (not indicated) is applied to the drum 84 by a cylinder 86 which is rotated counterclockwise at constant speed. The developing substance forms a magnetic brush on the cylinder 86 which brushingly engages the drum 84. Although not shown, the lower portion of the cylinder 86 is immersed in developing substance in a developing tank and the developing substance is attracted and adhered to the cylinder 86 by magnetic force.

A scraper plate 87 scrapingly engages the cylinder 86 to remove developing substance therefrom after engagement with the drum 84. The scraper 87 is inclined downwardly so that the removed developing substance slides theredown under the force of gravity. An opening 88 formed through the plate 87 leads into the conduit 82 so that part of the developing substance sliding down the plate 87 falls through the conduit 82.

Axially aligned with the opening 88 are a charging unit 89 and a light source 91 which are circumferentially spaced about the drum 84 with the light source 91 being downstream of the charging unit 89. The charging unit 89 uniformly charges the right portion of the drum 84. The light source 91 is adapted to be energized intermittently at regular intervals.

When the light source 91 is turned on, it illuminates the adjacent portion of the drum 84 causing photoconduction and dissipation of the electrostatic charge. Thus, alternating circumferentially spaced bands of charged and discharged areas are formed on the drum 84. The toner substance adheres to the charged areas on the drum 84 as indicated at 93. However, the portions of the drum 84 which were illuminated and discharged do not attract toner from the cylinder 86 and are indicated at 94.

Although not illustrated in the drawing, alternating circumferentially spaced bands are formed on the cylinder 86. Where toner was removed from the cylinder 86 to develop the charged areas of the drum 84, the toner density on the cylinder 86 will be increased. Alternating with the areas or bands from which toner was removed are areas or bands corresponding to the discharged areas of the drum 84 to which no toner transfer occured from the cylinder 86. The developing substance scraped from the cylinder 87 and falling through the conduit 82 alternates between portions of initial toner density and portions from which toner was removed. The proportion of the toner transferred to the drum 84 is determined by the degree of deterioration of the developing substance. The greater the degree of deterioration, the less toner will be transferred and the greater the toner density of the developing substance on the cylinder 86.

The coil 83 senses the toner density of the alternating portions in the manner described above. The difference between the sensed values constitutes a measure of the developer deterioration.

Figure 5:
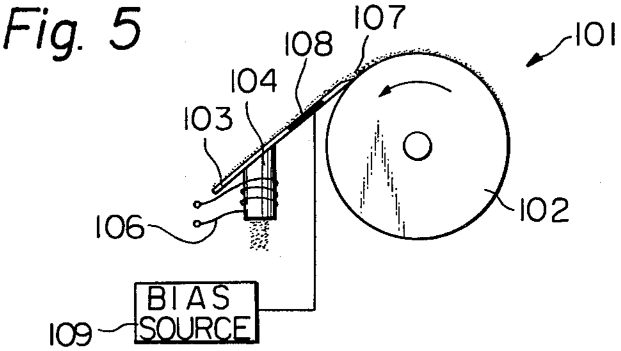
FIG. 5 illustrates a fourth embodiment of the present invention.

FIG. 5 illustrates another apparatus 101 of the present invention which comprises a cylinder 102 corresponding to the cylinder 86. A scraper plate 103 and conduit 104 around which is wound a coil 106 are arranged in the same general manner as the scraper plate 87, conduit 82 and coil 83. However, the charging unit 89 and light source 91 are omitted and a developing substance 107 carried by the cylinder 102 is brushed in engagement with a completely discharged portion of a photoconductive drum (not shown). In other words, the developing substance 107 has the same toner density as the developing substance in the developing tank. Alternatively, the cylinder 102 may be separate from a cylinder used to apply a magnetic brush to the drum.

A bias voltage source 109 is arranged to apply an alternating electric potential to a bias electrode 108 provided to the scraper plate 103 just upstream of the conduit 104. Assuming that the toner particles carry a negative charge, toner particles will be attracted and electrostatically adhered to the bias electrode 108 whenever the applied potential is positive to an extent depending on the developer deterioration. When the potential goes negative, the toner particles will be released. Since the carrier particles are uneffected by the bias voltage, they will slide down the scraper blade 103 into the conduit 104 regardless of the polarity of the applied potential. Thus, the amount of carrier particles falling through the conduit 104 will be constant but the amount of toner particles will be alternatingly high and low depending on the instantaneous polarity of the applied bias voltage.

Figure 6:
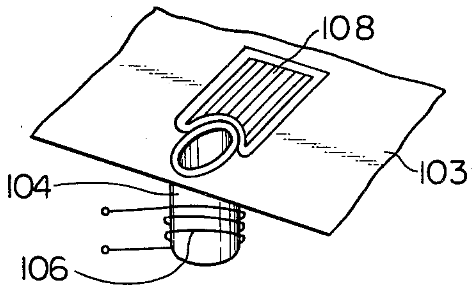
FIG. 6 is a perspective view of a portion of the embodiment of FIG. 5.
Figure 7:
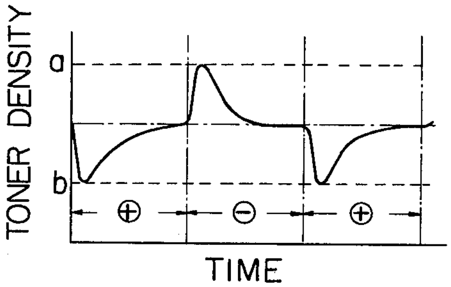
FIG. 7 is a graph illustrating the operation of the embodiment of FIG. 5.

The toner density corresponding to the polarity of the applied bias voltage is shown in the graph of FIG. 7. The toner density has a minimum value b where the voltage is positive and toner particles are held to the electrode 108. The toner density has a maximum value a when the voltage is negative and the toner particles previously held to the electrode 108 are released and added to the incoming developing substance 107. The difference between the values a and b correponds to the developer deterioration. The values a and b correspond to the initial toner density of the developing substance 107 plus and minus the toner adhered to the electrode 108 respectively. Preferably, the electrode 108 has a configuration shown in FIG. 6 which forms a microfield or takes advantage of the edge effect. As a modification to the embodiment of FIG. 5, the bias source 109 may be adapted to alternatingly apply a positive and zero potential to the electrode 108.

Figure 8:
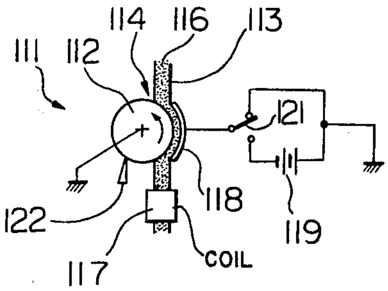
FIG. 8 illustrates a modification of the embodiment of FIG. 2.

Another apparatus 111 embodying the present invention is illustrated in FIG. 8 and comprises a cylinder 112 which intrudes into an opening 114 formed in a conduit 113 through which falls a developing substance 116. The cylinder 112 is grounded and rotated counterclockwise, or opposite to the direction of flow of developing substance 116 therearound. A coil 117 or other toner density sensor is provided to the conduit 113 below the cylinder 112. The portion of the wall of the conduit 113 conjugate to the cylinder 112 is constituted by an electrode 118. A bias voltage source 119 and a switch 121 function to alternatingly apply a negative potential and ground potential to the electrode 118.

When the negative potential is applied to the electrode 118, toner is repelled away from the electrode 118 onto the cylinder 112 which carries the toner away from the conduit 113. The amount of toner removed is determined by the developer deterioration. A scraper blade 122 removes the toner from the cylinder 112. Thus, the developing substance 116 is depleted of toner when the applied voltage is negative.

However, when the voltage applied to the electrode 118 is ground, no toner is removed by the cylinder 112. The difference between the maximum and minimum values of toner density sensed by the coil 117 corresponds to the developer deterioration.

Figure 9:
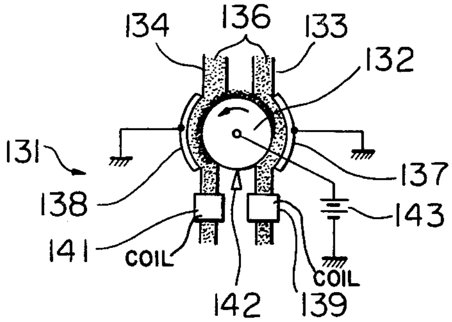
FIG. 9 illustrates another modification of the embodiment of FIG. 2.

FIG. 9 illustrates another apparatus 131 of the present invention which comprises a cylinder 132 intruding into first and second conduits 133 and 134 respectively through which a developing substance 136 falls. Grounded electrodes 137 and 138 are provided to the conduits 133 and 134 respectively. Coils 139 and 141 are provided to the conduits 133 and 134 respectively below the cylinder 132 and a scraper 142 engages the bottom of the cylinder 132. A bias voltage source 143 applies a positive potential to the cylinder 132.

The cylinder 132 is rotated counterclockwise at a constant speed. Toner in the developing substance 136 falling through the conduit 133 is adhered to the cylinder 132 to an extent depending on the developer deterioration. The removed toner is carried by the cylinder 132 to the conduit 134 where some of it is mixingly added to the developing substance 136 in the conduit 134. Thus, the coils 139 and 141 will sense minimum and maximum toner densities respectively, the difference therebetween corresponding to the degree of developer deterioration.

In summary, it will be seen that the present invention provides an accurate but simple and inexpensive apparatus for measuring the degree of deterioration of a dry developing substance in an electrostatographic apparatus. Certain embodiments of the invention also function to measure the toner density for determination of the toner replenishment rate. Various modifications will become possible for those skilled in the art after receiving the teachings of the present disclosure without departing from the scope thereof. For example, the scraper blade 103 of FIG. 5 may be adapted to scrape only an outer portion of the developing substance from the cylinder 102.

What is claimed is:

1. A method of sensing deterioration of a developing substance which includes ferromagnetic carrier particles and non-magnetic toner particles, the method comprising the steps of:

applying a predetermined force to the developing substance for readily removing substantially all of the toner particles therefrom except for spent toner particles which are strongly adhered to the carrier particles;

measuring the toner density of the remaining developing substance after removal of the toner particles therefrom;

comparing the measured toner density with a reference toner density; and calculating the deterioration of the developing substance as a predetermined function of the comparison.

2. An apparatus for sensing deterioration of a developing substance which includes ferromagnetic carrier particles and non-magnetic toner particles, the apparatus comprising:

first means for applying a predetermined force to the developing substance for readily removing substantially all of the toner particles therefrom except for spent toner particles which are strongly adhered to the carrier particles;

second means for measuring the toner density of the remaining developing substance after removal of the toner particles therefrom; and third means for providing a reference toner density for comparison with the measured toner density.

3. An apparatus as in claim 2, comprising a first substantially vertical conduit through which the developing substance is caused to fall by gravity, the first and second means being provided on the first conduit.

4. An apparatus as in claim 3, in which the first conduit is provided with an intermediate mesh portion, the first means being disposed in such a manner as to urge toner through the mesh portion external of the first conduit.

5. An apparatus as in claim 4, in which the first means comprises suction means.

6. An apparatus as in claim 3, in which the first conduit is provided with a detachable cap at a first initially upper end and a mesh at a second initially lower end thereof, the first means being disposed in such a manner as to urge toner through the mesh external of the first conduit, the second and third means being integral and measuring the reference toner density while the developing substance falls from the first end to the second end of the first conduit, the conduit being adapted to be inverted after toner is removed therefrom through the mesh by the first means, the integral second and third means measuring said measured toner density while the developing substance falls from the second end to the first end of the first conduit.

7. An apparatus as in claim 6, in which the first means comprises suction means.

8. An apparatus as in claim 3, in which the second means comprises an electromagnetic coil, the developing substance in the first conduit being electromagnetically coupled with the coil.

9. An apparatus as in claim 8, in which the third means comprises an electromagnetic coil.

10. An apparatus as in claim 9, in which the second and third means comprise oscillators respectively, the coils of the second and third means constituting frequency determining elements of the respective oscillators, the apparatus further comprising comparator means for comparing frequencies of the oscillators.

11. An apparatus as in claim 10, in which the coil of the third means has a predetermined inductance.

12. An apparatus as in claim 10, in which the coil of the third means is provided on the first conduit above the first means, the developing substance in the first conduit being electromagnetically coupled with the coil of the third means.

13. An apparatus as in claim 3, in which the third means is provided on the first conduit above the first means and is operative to sense the reference density as a toner density of the developing substance before removal of toner therefrom by the first means.

14. An apparatus as in claim 13, in which the second means is provided on the first conduit below the first means, the second and third means each comprising a transparent wall portion of the conduit and photosensor means for sensing an optical density of the developing substance through the respective transparent wall portion.

15. An apparatus as in claim 3, in which the first conduit is formed with a cutout, the first means comprising a rotary member intruding into the first conduit through the cutout in such a manner that the developing substance is caused to flow around the rotary member while falling through the first conduit, the apparatus further comprising bias means for applying an electric potential urging toner to be electrostatically attracted to the rotary member and carried thereby external of the first conduit.

16. An apparatus as in claim 15, in which the bias means applies an electric potential of a polarity opposite to a polarity of an electrostatic charge on the toner to the rotary member.

17. An apparatus as in claim 15, in which the rotary member rotates in such a direction that a portion thereof around which the developing substance flows moves in a same direction as a direction of movement of the developing substance.

18. An apparatus as in claim 15, in which the first conduit is provided with a bias electrode adjacent to the rotary member in such a manner that the developing substance is caused to flow between the electrode and the rotary member while falling through the first conduit, the bias means applying an electrical potential of a same polarity as an electrostatic charge on the toner to the electrode.

19. An apparatus as in claim 18, in which the rotary member rotates in such a direction that a portion thereof around which the developing substance flows moves in an opposite direction to a direction of movement of the developing substance.

20. An apparatus as in claim 15, in which the second and third means are integral and are provided on the first conduit below the first means, the bias means being adapted to alternatingly apply and remove the electric potential, the integral second and third means measuring said measured toner density with the electric potential applied and the reference toner density with the electrical potential removed.

21. An apparatus as in claim 15, further comprising a second substantially vertical conduit through which the developing substance is caused to fall by gravity, the second conduit being formed with a cutout, the rotary member intruding into the second conduit through the cutout thereof in such a manner that the developing substance is caused to flow around the rotary member while falling through the second conduit, toner removed from said first conduit being carried into the second conduit and mixingly added to developing substance in the second conduit, the third means being provided to the second conduit below the rotary member.

22. An apparatus as in claim 15, further comprising a scraper for removing toner from the rotary member external of the conduit.

23. An apparatus as in claim 3, further comprising a rotary member to which the developing substance is initially adhered and a scraper for scraping developing substance off the rotary member, the developing substance being caused by gravity to slide down the scraper into the first conduit.

24. An apparatus as in claim 23, in which the first means comprises an electrode provided on the scraper between the rotary member and the first conduit and bias means for applying an electric potential to the electrode to attract and adhere toner thereto.

25. An apparatus as in claim 24, in which the bias means is arranged to alternatingly apply the electric potential to and remove the electric potential from the electrode.

26. An apparatus as in claim 23, in which the first means comprises an electrode provided on the scraper between the rotary member and the first conduit and bias means for applying an alternating electric potential to the electrode.

27. An apparatus as in claim 23, in which the first means comprises removing means for intermittently removing toner from the rotary member.

28. An apparatus as in claim 27, in which the removing means comprises a rotary photoconductive member which brushingly engages with the rotary member, charging means for applying an electrostatic charge to the photoconductive member and light source means for intermittently illuminating a portion of the photoconductive member between the charging means and the rotary member.

* * * * *